(12) United States Patent
Dinger et al.

(10) Patent No.: US 11,373,056 B2
(45) Date of Patent: Jun. 28, 2022

(54) CONTEXT DRIVEN MODEL SELECTION

(71) Applicant: International Business Machines Corporation, Armonk, NY (US)

(72) Inventors: Timothy R. Dinger, Croton-on-Hudson, NY (US); Yuan-Chi Chang, Armonk, NY (US); Long Vu, Chappaqua, NY (US); Venkata N. Pavuluri, New Rochelle, NY (US); Lingtao Cao, Hayward, CA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 16/692,148

(22) Filed: Nov. 22, 2019

(65) Prior Publication Data

US 2021/0158084 A1    May 27, 2021

(51) Int. Cl.
*G06K 9/36* (2006.01)
*G06K 9/62* (2022.01)
*G06N 20/00* (2019.01)

(52) U.S. Cl.
CPC .......... *G06K 9/6227* (2013.01); *G06K 9/623* (2013.01); *G06K 9/6232* (2013.01); *G06K 9/6288* (2013.01); *G06N 20/00* (2019.01)

(58) Field of Classification Search
CPC ...... G06V 10/87; G06V 10/82; G06V 10/806; G06V 10/803; G06K 9/6227; G06K 9/6288; G06T 2207/20081; G06T 2207/20084; G06T 3/4046; G06T 9/002; G06N 3/063; G06N 3/02–3/105; G06N 20/00–20/20
See application file for complete search history.

(56) References Cited

U.S. PATENT DOCUMENTS

| | | | |
|---|---|---|---|
| 7,085,690 B2 | 8/2006 | Sale | |
| 7,233,886 B2 | 6/2007 | Wegerich et al. | |
| 7,317,953 B2 | 1/2008 | Wojsznis et al. | |
| 7,480,640 B1 | 1/2009 | Elad et al. | |
| 7,756,804 B2 | 7/2010 | Bloom et al. | |
| 7,809,729 B2 | 10/2010 | Chu et al. | |
| 8,020,104 B2 | 9/2011 | Robarts et al. | |
| 8,280,533 B2 | 10/2012 | Wojsznis et al. | |
| 10,310,456 B2 | 6/2019 | Caldwell et al. | |
| 2017/0300933 A1* | 10/2017 | Mascaro | G06Q 10/0639 |
| 2017/0329881 A1 | 11/2017 | Korada et al. | |
| 2019/0156247 A1 | 5/2019 | Faulhaber, Jr. et al. | |
| 2020/0125900 A1* | 4/2020 | Posner | G06K 9/6284 |

* cited by examiner

*Primary Examiner* — Brian Werner
(74) *Attorney, Agent, or Firm* — Stephen J. Walder, Jr.; Jorge Maranto (57) ABSTRACT

Mechanism are provided to select a machine learning model from an analytics model library based on ingested data. One or more pieces of clarified data are fused to provide time-correlated data tuples of data streams. One or more features are extracted from the time-correlated data tuples and scored based on a set of predetermined rules thereby generating discriminative scoring of trigger data. Utilizing the discriminative scoring of the trigger data, trigger data of a current analytics model being utilized by the data processing and one or more new analytics models from the analytics model library are scored. Responsive to the scoring of the trigger data indicating a selection of a different analytics model from the analytics model library, the current analytics model is replaced with a selected analytics model from the analytics model library such that the data processing system executes the selected analytics model.

20 Claims, 5 Drawing Sheets

CONTEXT DRIVEN MODEL SELECTION

BACKGROUND

The present application relates generally to an improved data processing apparatus and method and more specifically to mechanisms for selecting a machine learning model from a model library based on data/context.

The ubiquity of sensors in the real world has grown swiftly with the availability of network bandwidth to support the proliferation. The ability to analyze data streaming from these sensors is valuable and has become possible as streaming analytic engines have matured and analytic methods have improved. In the sense that much of the data generated has a limited useful life, analytics must be able to perform within a time window that allows meaningful action to be taken in response to the data collected.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, comprising at least one processor and at least one memory is provided, where the at least one memory comprises instructions that are executed by the at least one processor to configure the at least one processor to select a machine learning model from an analytics model library based on ingested data. The illustrative embodiment fuses one or more pieces of clarified data to provide time-correlated data tuples of data streams. The illustrative embodiment extracts one or more features from the time-correlated data tuples. The illustrative embodiment scores the one or more features based on a set of predetermined rules thereby generating discriminative scoring of trigger data. The illustrative embodiment utilizes the discriminative scoring of the trigger data to scores trigger data of a current analytics model being utilized by the data processing and one or more new analytics models from the analytics model library. The illustrative embodiment replaces the current analytics model with a selected analytics model from the analytics model library such that the data processing system executes the selected analytics model in response to the scoring of the trigger data indicating a selection of a different analytics model from the analytics model library.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As stated previously, the ubiquity of sensors in the real world has grown swiftly with the availability of network bandwidth to support the proliferation. The ability to analyze data streaming from these sensors is valuable and has become possible as streaming analytic engines have matured and analytic methods have improved. In the sense that much of the data generated has a limited useful life, analytics must be able to perform within a time window that allows meaningful action to be taken in response to the data collected.

The illustrative embodiments provide a contextual tuning mechanism that contextual tunes analytics to provide the most accurate or relevant analytic output. That is, the illustrative embodiments analyze real-time streaming data, typically generated by sensors, that is highly dependent on the context of the collection environment. As such, the contextual tuning mechanism tunes the analysis so as to improve the performance by choosing analytics that are appropriate for current data context. The illustrative embodiments provide a dynamic in-place process for the contextual tuning mechanism to change the current scoring model to match the data context.

For instance, recommending the corner deli to a pedestrian with location services turned on for their mobile phone is not useful if the calculation cannot be made and delivered before the pedestrian gets to the train station and is well on their way. Likewise, contextual information may have significant effect on the analytics in question. If the pedestrian's credit card information becomes part of the data being analyzed, the location service may choose not to deliver the corner deli advertisement if a transaction for another restaurant has already come through.

Similarly, real-time decision support systems may have delivery thresholds Which inform the system to choose analytics based on the need to deliver insights more or less quickly. These analytics may also differ based on contextual data altering the immediate analysis. An example of this kind of contextually-informed model invocation would be an Intensive Care Unit (ICU) which is analyzing real-time patient monitor data and deploys a particular cardiac analytic based on the current signature of the patient's electrocardiogram (EKG) signal. For instance, if the patient's EKG begins to exhibit noisy or erratic behavior, an arrhythmia analytic may then be automatically deployed to more sensitively analyze the EKG signal.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
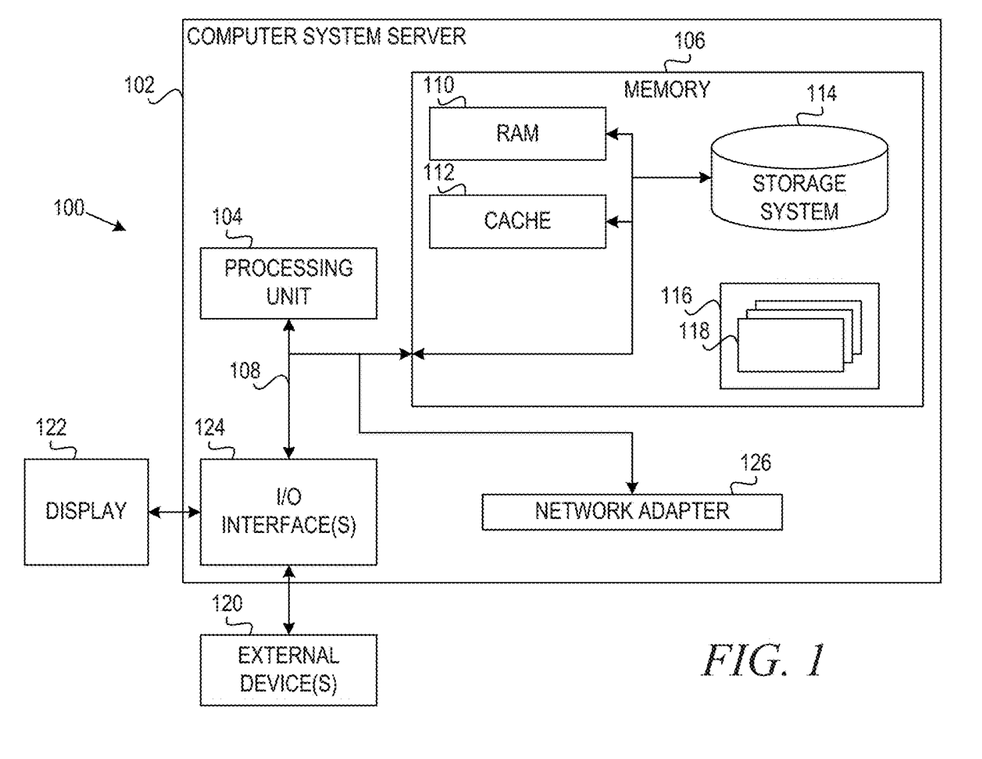
FIG. 1 depicts an exemplary cloud computing node in which aspects of the illustrative embodiments may be implemented.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth herein.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116, having a set (at least one) of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 118 generally carry out the functions and/or methodologies of embodiments of the invention as described herein.

Computer system/server 102 may also communicate with one or more external devices 120 such as a keyboard, a pointing device, a display 122, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 124. Still yet, computer system/server 102 can communicate with one or more networks such as a local area network (LAN), a general wide area network (WAN), and/or a public network (e.g., the Internet) via network adapter 126. As depicted, network adapter 126 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

As shown in FIG. 1, one or more of the computing devices, e.g., computer system/server 102, may be specifically configured to implement a contextual tuning mechanism for contextual tuning of analytics to provide the most accurate or relevant analytic output. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer system/server 102, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates contextual tuning of analytics to provide the most accurate or relevant analytic output.

Figure 2:
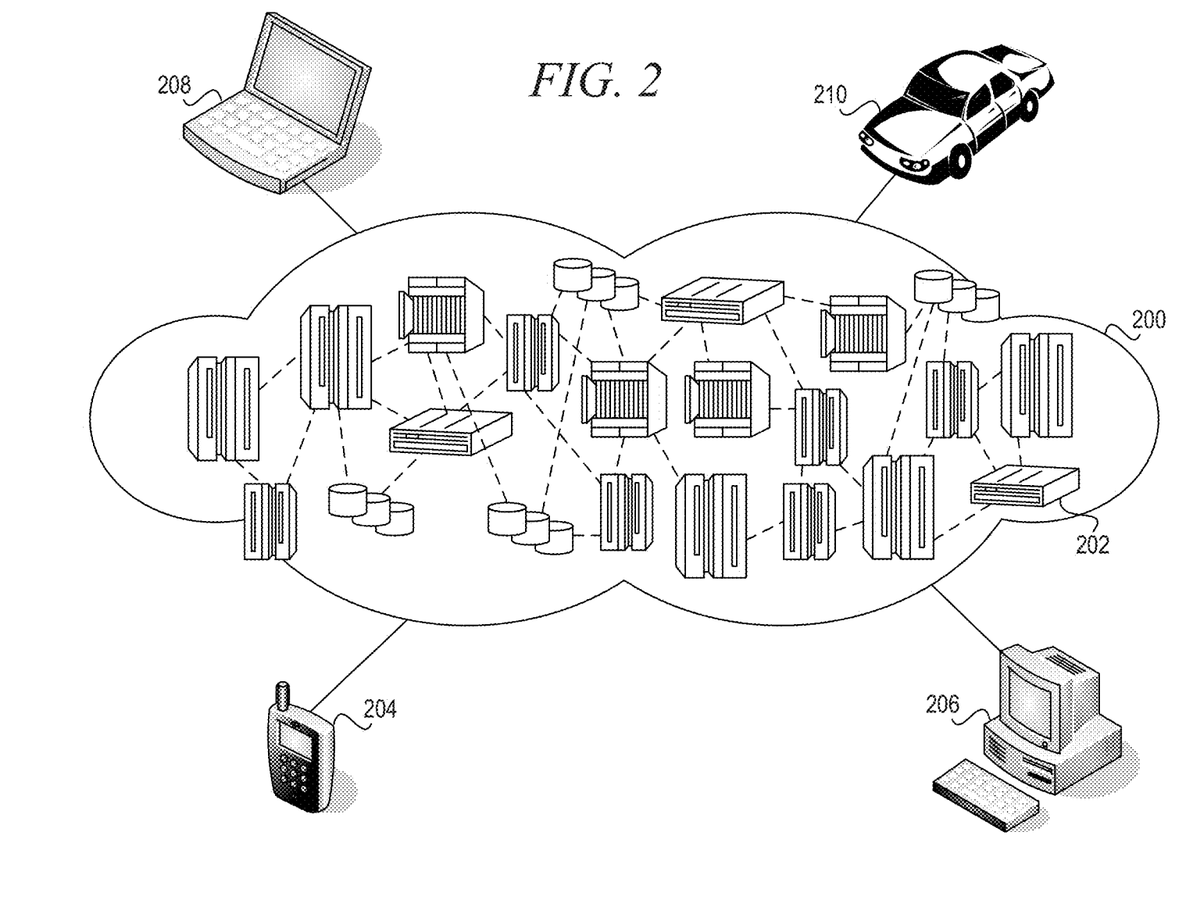
FIG. 2 depicts an exemplary cloud computing environment which aspects of the illustrative embodiments may be implemented.

As noted above, the mechanisms of the illustrative embodiments utilize specifically configured computing devices, or data processing systems, to perform the operations for contextual tuning of analytics to provide the most accurate or relevant analytic output. These computing devices, or data processing systems, may comprise various hardware elements which are specifically configured, either through hardware configuration, software configuration, or a combination of hardware and software configuration, to implement one or more of the systems/subsystems described herein. FIG. 2 depicts an exemplary cloud computing environment 200 in accordance with an illustrative embodiment. As shown, cloud computing environment 200 comprises one or more cloud computing nodes 202, such as cloud computing node 100 of FIG. 1, with which local computing devices used by cloud consumers, such as, for example, personal digital assistant (PDA) or cellular telephone 204, desktop computer 206, laptop computer 208, and/or automobile computer system 210 may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 2 are intended to be illustrative only and that computing nodes 202 and cloud computing environment 200 can communicate with any type of computerized device over any type of network and/or network addressable connection (e.g., using a web browser). As such, computing devices 204-210 shown in FIG. 2 become specifically configured to implement the mechanisms of the illustrative embodiments and specifically configured to perform the operations and generate the outputs described hereafter with regard to contextual tuning of analytics to provide the most accurate or relevant analytic output.

Figure 3:
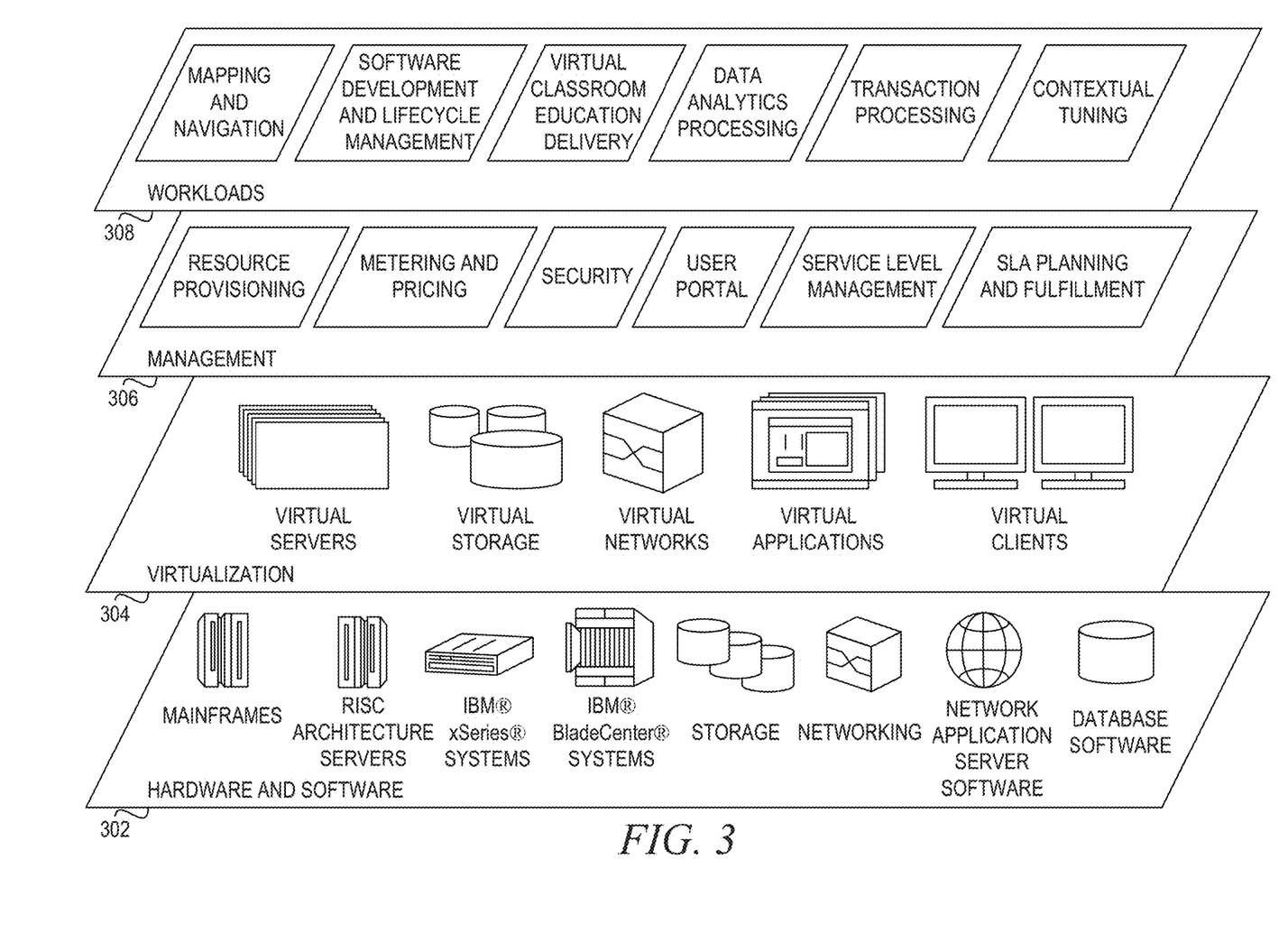
FIG. 3 depicts abstraction model layers of a cloud computing environment in which aspects of the illustrative embodiments may be implemented.

Referring now to FIG. 3, a set of functional abstraction layers provided by a cloud computing environment, such as cloud computing environment 200 of FIG. 2, is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; transaction processing; and contextual tuning.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Thus, the illustrative embodiments may be utilized in many different types of data processing environments. In order to provide a context for the description of the specific elements and functionality of the illustrative embodiments, FIGS. 1-3 are provided as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system without departing from the spirit and scope of the present invention.

Figure 4:
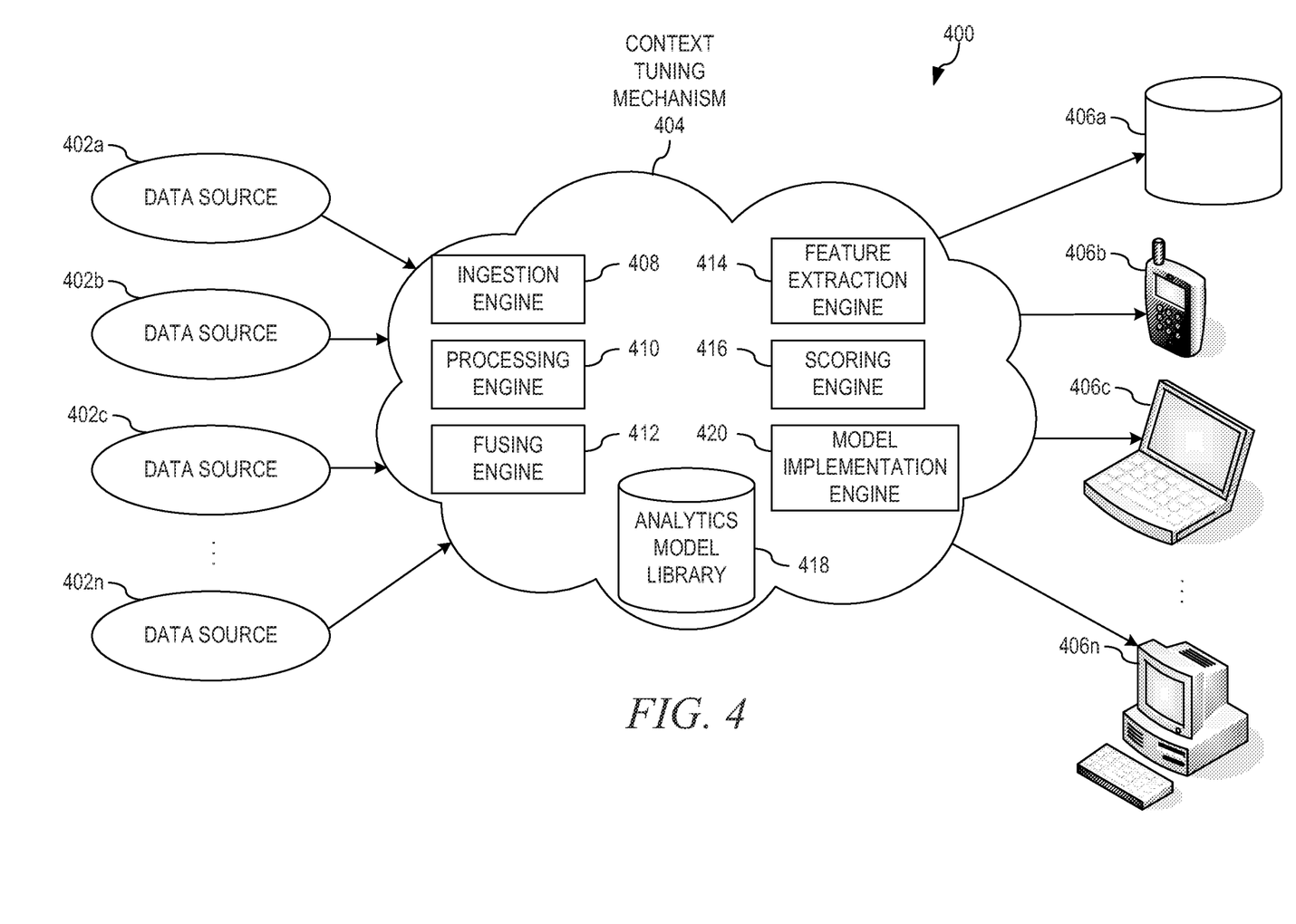
FIG. 4 depicts an exemplary function block diagram of a contextual tuning mechanism for selecting a machine learning model from a model library based on data/context in accordance with an illustrative embodiment.

FIG. 4 depicts an exemplary function block diagram of a contextual tuning mechanism for selecting a machine learning model from a model library based on data/context in accordance with an illustrative embodiment. Predictive analysis using real-time Internet of Things (IoT) data is influenced by the contextual environment from which the data is generated, making a single generalized model potentially less accurate than models tuned to a particular data context. Thus, the contextual tuning mechanism of the illustrative embodiments provides for contextual tuning of analytics to provide the most accurate or relevant analytic output.

Data processing system 400 comprises one or more data sources 402a-402n, contextual tuning mechanism 404, and one or more output devices 406a-406n. Data sources 402a-402n provide real-time streaming data so as provide further opportunities for contextual tuning based on alternative data modalities. Contextual tuning mechanism 404, which will be further detailed hereafter, is a "backend" computing environment, typically in a cloud environment such as cloud computing node 100 of FIG. 1, which comprises a set of real-time analytics engines and file system that holds a library of analytic models. One or more of output devices 406a-406n provide for a user to either extract or receive data from contextual tuning mechanism 404 that indicates analytic results or insights as to a selected machine learning model based on data/context analysis performed by contextual tuning mechanism 404.

Again, contextual tuning mechanism 404 utilizes incoming contextual data from one or more of data sources 402a-402n to optimize the analytic outcome provided by contextual tuning mechanism 404. More specifically contextual tuning mechanism 404 comprises ingestion engine 408 that ingests data from disparate data sources and/or disparate Internet of Things (IoT) data sources, such as data sources 402a-402n. Processing engine 410 then processes the ingested data to clarify the data, such as by filtering of erroneous data, filling in of missing data, time ordering of data, deduplication of data, or the like. Fusing engine 412 then fuses one or more pieces of the clarified data to provide time-correlated data tuples of data streams. Utilizing the time-correlated data tuples, feature extraction engine 414 extracts one or more features from the time-correlated data tuples for model triggering purposes or for predictive model scoring purposes. Scoring engine 416 then scores the features extracted by the feature extraction engine 414 based on a set of predetermined rules such that the discriminative scoring of the trigger data may be utilized to score not only the current analytics model being utilized by data processing 400 but also utilized to select a new analytics model from analytics model library 418 to possibly replace the current analytics model if the scoring of the new analytics model exceeds the current analytics model. For example, one predetermined rule in the set of predetermined rules may be that: if the age of the patient is >2 and if the heart rate is >140 beats/minute and if the SPO2<85, then switch to the arrhythmia detector model.

Scoring engine 416 may utilize any number of approaches to index the analytics models in analytics model library 418 for possible selection. That is, the analytics models in analytics model library 418 may be indexed depending on the particular data characteristic which may trigger a model change such as, but not limited to, indexing by discrete data, indexing via thresholding of continuous data, indexing as a result of on-the-fly calculations, or the like. Each of these approaches may utilize triggers such as, but not limited to, time of day, age of user, day of week, Systolic Blood Pressure>140 mmHg, current Global Positioning System (GPS) location versus previous GPS location, time difference between GPS readings, speed, or the like.

Therefore, if scoring engine 416 determines that the feature scoring of the trigger data does not indicate a need for a different analytics model from analytics model library 418, scoring engine 416 provides an indication to data processing system 400 to continue using the current analytics model. However, if scoring engine 416 determines the scoring of trigger data indicates the selection of a different analytics model from analytics model library 418, scoring engine 416 suspends scoring of the current analytics model and model implementation engine 420 preserves a current analytic state of data processing system 400 and loads the new context-appropriate analytics model from analytics model library 418, which is then executed by data processing system 400. Once the new context-appropriate analytics model is loaded into data processing system 400 and is being executed by data processing system 400, scoring engine 416 resumes scoring of the new context-appropriate analytics model as a new current analytics model and the operation begins again utilizing new data from one or more of data sources 402a-402n.

In order to exemplify the operation performed by contextual tuning mechanism 404, consider the following. In Civil Defense, radar information is processed in real-time for detection and classification of air traffic entering a restricted airspace. In one situation, a detected object is proceeding at an air speed of 180 miles per hour (mph) toward a target at a center of a restricted air space. Given the air speed of the object, contextual tuning mechanism 404 chooses a relatively computationally heavy, but slow and more accurate trajectory projection analytics model is chosen from analytics model library 418. This choice is in line with rules based on the air speed of the detected object, its distance from the target, and allowable time for decision, and is used to predict the object's trajectory and generate alerts.

The radar system and the associated apparatus then detects that the object has increased its air speed to 800 mph toward the target. Based on the contextual tuning provided by the air speed calculation, contextual tuning mechanism 404 halts trajectory projection using the slow trajectory projection analytics model and replaces the slow trajectory projection analytics model with a faster less accurate trajectory projection analytics model from analytics model library 418. The faster trajectory projection analytics model is loaded into the prediction framework and trajectory projection is predicted much more quickly but less accurately to permit civil defense forces to intercept the object.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
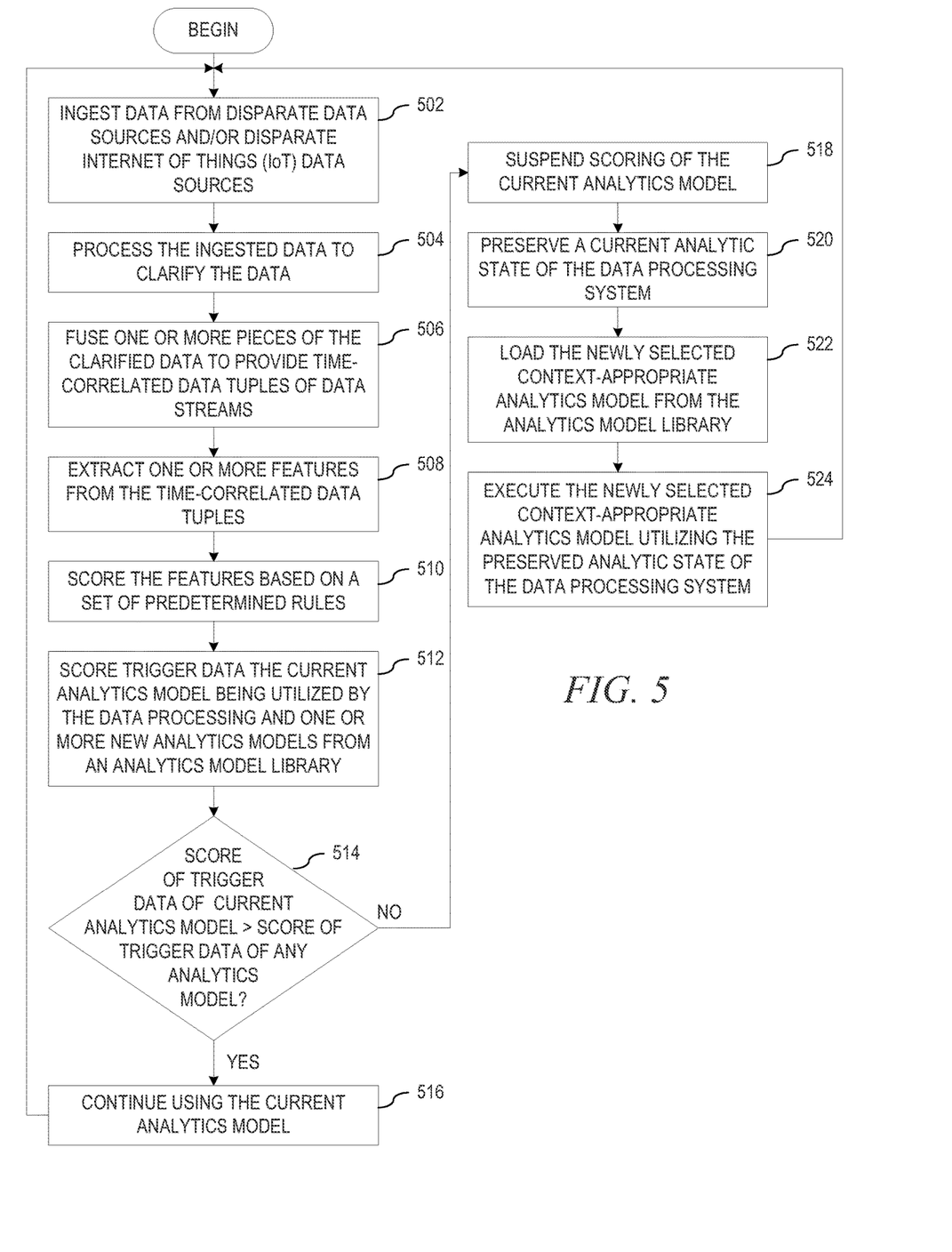
FIG. 5 depicts a flowchart of the operation performed by a contextual tuning mechanism in selecting a machine learning model from a model library based on data/context in accordance with an illustrative embodiment.

FIG. 5 depicts a flowchart of the operation performed by a contextual tuning mechanism in selecting a machine learning model from a model library based on data/context in accordance with an illustrative embodiment. As the operation begins, the contextual tuning mechanism ingests data from disparate data sources and/or disparate Internet of Things (IoT) data sources (step 502). The contextual tuning mechanism then processes the ingested data to clarify the data (step 504), such as by filtering of erroneous data, filling in of missing data, time ordering of data, deduplication of data, or the like. The contextual tuning mechanism fuses one or more pieces of the clarified data to provide time-correlated data tuples of data streams (step 506). Utilizing the time-correlated data tuples, the contextual tuning mechanism extracts one or more features from the time-correlated data tuples (step 508) for model triggering purposes or for predictive model scoring purposes. The contextual tuning mechanism then scores the features based on a set of predetermined rules (step 510) to create discriminative scoring of the trigger data. Utilize the discriminative scoring of the trigger data to score the current analytics model being utilized by the data processing and one or more new analytics models from an analytics model library to possibly replace the current analytics model if the scoring of the new analytics model exceeds the current analytics model (step 512).

The contextual tuning mechanism then determines whether the score of the trigger data of the current analytics model exceeds the scoring of trigger data associated with the selected analytics model from the analytics model library (step 514). If at step 514 the contextual tuning mechanism determines that the feature scoring of the trigger data does not indicate a need for a different analytics model selected from the analytics model library, the contextual tuning mechanism provides an indication to the data processing system to continue using the current analytics model (step 516), with the operation returning to step 502 thereafter. If at step 514 the contextual tuning mechanism determines the scoring of trigger data indicates the selection of a different analytics model from the analytics model library, the contextual tuning mechanism suspends scoring of the current analytics model (step 518) and preserves a current analytic state of the data processing system (step 520). The contextual tuning mechanism then loads the newly selected context-appropriate analytics model from the analytics model library (step 522). The data processing system then executes the newly selected context-appropriate analytics model utilizing the preserved analytic state of the data processing system (step 524), with the operation returning to step 502 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for a contextual tuning mechanism that contextual tunes analytics to provide the most accurate or relevant analytic output. That is, the illustrative embodiments analyze real-time streaming data, typically generated by sensors, that is highly dependent on the context of the collection environment. As such, the contextual tuning mechanism tunes the analysis so as to improve the performance by choosing analytics that are appropriate for current data context. The illustrative embodiments provide a dynamic in-place process for the contextual tuning mechanism to change the current scoring model to match the data context.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the at least one processor to select a machine learning model from an analytics model library based on ingested data, the method comprising:

fusing one or more pieces of clarified data to provide time-correlated data tuples of data streams;
extracting one or more features from the time-correlated data tuples;
scoring the one or more features based on a set of predetermined rules thereby generating discriminative scoring of trigger data;
utilizing the discriminative scoring of the trigger data, scoring trigger data of a current analytics model being utilized by the data processing and one or more new analytics models from the analytics model library; and
responsive to the scoring of the trigger data indicating a selection of a different analytics model from the analytics model library, replacing the current analytics model with a selected analytics model from the analytics model library such that the data processing system executes the selected analytics model.

2. The method of claim 1, wherein replacing the current analytics model with the selected analytics model comprises:

suspending a scoring of the current analytics model;
preserving a current analytic state of the data processing system;
loading the newly selected analytics model from the analytics model library into the data processing system; and
executing the newly selected analytics model utilizing the preserved analytic state of the data processing system.

3. The method of claim 1, wherein the clarified data is ingested data clarified by one or more of filtering of erroneous data, filling in of missing data, time ordering of data, or deduplication of data.

4. The method of claim 3, wherein the ingested data is data from one or more of disparate data sources or disparate Internet of Things (IoT) data sources.

5. The method of claim 1, further comprising:

responsive to the scoring of the current analytics model being greater than the scoring of any analytics model from the analytics model library, continuing execution of the current analytics model.

6. The method of claim 1, wherein the analytics models in the analytics model library are indexed according to one or more of indexing by discrete data, indexing via thresholding of continuous data, or indexing as a result of on-the-fly calculations.

7. The method of claim 1, wherein the trigger data is one or more of a time of day, an age of user, a day of week, a blood pressure threshold, a Global Positioning System (GPS) location, a time difference between GPS readings, or a speed.

8. A computer program product comprising a computer readable storage medium having a computer readable program stored therein, wherein the computer readable program, when executed on a data processing system, causes the data processing system to select a machine learning model from an analytics model library based on ingested data, and further causes the data processing system to:

fuse one or more pieces of clarified data to provide time-correlated data tuples of data streams;
extract one or more features from the time-correlated data tuples;
score the one or more features based on a set of predetermined rules thereby generating discriminative scoring of trigger data;
utilizing the discriminative scoring of the trigger data, score trigger data of a current analytics model being utilized by the data processing and one or more new analytics models from the analytics model library; and
responsive to the scoring of the trigger data of the trigger data indicating a selection of a different analytics model from the analytics model library, replace the current analytics model with a selected analytics model from the analytics model library such that the data processing system executes the selected analytics model.

9. The computer program product of claim 8, wherein the computer readable program to replace the current analytics model with the selected analytics model further causes the data processing system to:

suspend a scoring of the current analytics model;
preserve a current analytic state of the data processing system;
load the newly selected analytics model from the analytics model library into the data processing system; and
execute the newly selected analytics model utilizing the preserved analytic state of the data processing system.

10. The computer program product of claim 8, wherein the clarified data is ingested data clarified by one or more of filtering of erroneous data, filling in of missing data, time ordering of data, or deduplication of data.

11. The computer program product of claim 10, wherein the ingested data is data from one or more of disparate data sources or disparate Internet of Things (IoT) data sources.

12. The computer program product of claim 8, wherein the computer readable program further causes the data processing system to:

responsive to the scoring of the current analytics model being greater than the scoring of any analytics model from the analytics model library, continue execution of the current analytics model.

13. The computer program product of claim 8, wherein the analytics models in the analytics model library are indexed according to one or more of indexing by discrete data, indexing via thresholding of continuous data, or indexing as a result of on-the-fly calculations.

14. The computer program product of claim 8, wherein the trigger data is one or more of a time of day, an age of user, a day of week, a blood pressure threshold, a Global Positioning System (GPS) location, a time difference between GPS readings, or a speed.

15. An apparatus comprising:

at least one processor; and
at least one memory coupled to the at least one processor, wherein the at least one memory comprises instructions which, when executed by the at least one processor, cause the at least one processor to select a machine learning model from an analytics model library based on ingested data, and further cause the at least one processor to:
fuse one or more pieces of clarified data to provide time-correlated data tuples of data streams;
extract one or more features from the time-correlated data tuples;
score the one or more features based on a set of predetermined rules thereby generating discriminative scoring of trigger data;

utilizing the discriminative scoring of the trigger data, score trigger data of a current analytics model being utilized by the data processing and one or more new analytics models from the analytics model library; and responsive to the scoring the trigger data indicating a selection of a different analytics model from the analytics model library, replace the current analytics model with a selected analytics model from the analytics model library such that the data processing system executes the selected analytics model.

16. The apparatus of claim 15, wherein the instructions to replace the current analytics model with the selected analytics model further cause the at least one processor to:

suspend a scoring of the current analytics model;

preserve a current analytic state of the data processing system;

load the newly selected analytics model from the analytics model library into the data processing system; and execute the newly selected analytics model utilizing the preserved analytic state of the data processing system.

17. The apparatus of claim 15, wherein the clarified data is ingested data clarified by one or more of tittering of erroneous data, filling in of missing data, time ordering of data, or deduplication of data.

18. The apparatus of claim 17, wherein the ingested data is data from one or more of disparate data sources or disparate Internet of Things (IoT) data sources.

19. The apparatus of claim 15, wherein the instructions further cause the at least one processor to:

responsive to the scoring of the current analytics model being greater than the scoring of any analytics model from the analytics model library, continue execution of the current analytics model.

20. The apparatus of claim 15, wherein the analytics models in the analytics model library are indexed according to one or more of indexing by discrete data, indexing via thresholding of continuous data, or indexing as a result of on-the-fly calculations.

\* \* \* \* \*